United States Patent [19]
Baltus et al.

[11] Patent Number: 5,632,398
[45] Date of Patent: May 27, 1997

[54] CARRYING COVER FOR A STEAM TABLE PAN

[75] Inventors: Jerome K. Baltus, Plymouth; Gene H. Jentink, Cedar Grove; Lee W. Wolf, Shebogan, all of Wis.

[73] Assignee: Polar Ware Company, Sheboygan, Wis.

[21] Appl. No.: 635,036

[22] Filed: Apr. 19, 1996

[51] Int. Cl.⁶ ................................................. B65D 25/28
[52] U.S. Cl. .................................... 220/212.5; 220/351
[58] Field of Search ................................. 220/351, 346, 220/212.5; 215/322

[56] References Cited

U.S. PATENT DOCUMENTS

| | | |
|---|---|---|
| 646,283 | 3/1900 | Heatly et al. . |
| 804,110 | 11/1905 | Favorite et al. . |
| 828,151 | 8/1906 | Upjohn . |
| 1,074,978 | 10/1913 | Relyea . |
| 1,660,540 | 2/1928 | Wulftange . |
| 1,962,860 | 6/1934 | Duell et al. . |
| 2,064,241 | 12/1936 | Batdorf . |
| 2,083,356 | 6/1937 | Batdorf . |
| 2,102,094 | 12/1937 | Romig . |
| 2,295,747 | 9/1942 | Mills . |
| 2,463,586 | 3/1949 | Anderson . |
| 3,237,552 | 3/1966 | Cronheim . |
| 3,854,649 | 12/1974 | Wagner et al. . |
| 3,927,820 | 12/1975 | Wagner et al. . |
| 4,225,052 | 9/1980 | Tector et al. . |
| 4,342,403 | 8/1982 | Badtke et al. . |
| 4,360,148 | 11/1982 | Forbes, Jr. ........................ 220/351 X |
| 4,469,241 | 9/1984 | Westphal ............................. 220/346 |
| 4,967,995 | 11/1990 | Burgess ........................... 220/351 X |
| 5,119,800 | 6/1992 | Roberts et al. . |
| 5,129,538 | 7/1992 | Bennett . |
| 5,361,933 | 11/1994 | Oster . |
| 5,367,718 | 11/1994 | Williams . |
| 5,375,698 | 12/1994 | Ewart et al. ..................... 220/351 X |
| 5,400,914 | 3/1995 | Lin . |
| 5,458,256 | 10/1995 | Opheim . |

FOREIGN PATENT DOCUMENTS 495204   1/1919   France ........................... 220/41

Primary Examiner—Stephen K. Cronin
Attorney, Agent, or Firm—Jansson & Shupe, Ltd.

[57] ABSTRACT

A carrying cover for a food pan includes a pair of side channels generally parallel to one another and first and second cover ends generally parallel to one another and generally normal to the side channels. The cover handle is positioned closer to the first end than to the second end. When the two cover side channels and the cover end channel are engaged with respective edges of a steam table pan for pan carrying, the cover handle is "off center" with respect to the pan center of gravity. The force of gravity urges the pan toward the cover end channel which prevents the pan from sliding out of the cover.

9 Claims, 5 Drawing Sheets

5,632,398

CARRYING COVER FOR A STEAM TABLE PAN

FIELD OF THE INVENTION

This invention relates to receptacles and, more particularly, to receptacles for carrying food and for holding such food as it is being served.

BACKGROUND OF THE INVENTION

A common sight in virtually any cafeteria or restaurant buffet setting is a steam table. Such a table has a upper surface with a number of relatively-large rectangular openings therethrough. Each opening receives a pan, the horizontal, outwardly-protruding edges of which are against the surface and prevent the pan from falling through the opening. Beneath the upper surface (and beneath the pans placed therein) is a shallow reservoir of hot water. Heat rising upward therefrom keeps the contents of the pans hot for serving.

Single-pan arrangements are sometimes known as "chafers" and use a source of heat, e.g., gelled combustible fuel or hot water, below the leg-supported serving pan. An example of a chafer of the type which uses hot water to keep food warm is shown in U.S. Pat. No. 5,119,800 (Roberts et al.).

For any of several reasons, steam table pans are notoriously difficult to handle. One reason is that they are large, unwieldly and when filled with food, comparatively heavy. Of course, relative weight is subjective but to a diminutive food server working on a cafeteria line, a steam table pan filled with, e.g., mashed potatoes or barbecued beef is likely to be considered heavy.

Another reason that steam table pans are difficult to handle arises from the fact that such pans have four flat edges protruding outwardly from the container portion. Each edge is substantially planar (as opposed to "rolled" or bead-like as the pan shown in U.S. Pat. No. 3,237,552 to Cronheim) and when the pan is mounted in an opening in the steam table, the pan edges are essentially flat against the steam table upper support surface. It is difficult to get one's fingers between the pan edge and the support surface to lift the pan out of its opening.

And it is difficult to "gracefully" release a filled pan into its opening—one must simply let go and tolerate the pan free-falling a short distance into position. For pans containing significant liquid, a spill may result.

Yet another disadvantage of known steam table pans and their covers is that the cover simply rests atop the pan with little if any "structure" to retain the cover in position. The person carrying the pan (and its hot contents) usually uses insulated pads and must, however awkwardly, somehow hold the cover in place while carrying.

A cover for carrying a steam table pan which overcomes some of the problems and shortcomings of known arrangements would be an important advance in the art.

OBJECTS OF THE INVENTION

It is an object of the invention to provide a cover for carrying a steam table pan which overcomes some of the problems and shortcomings of the prior art.

Another object of the invention is to provide a cover for carrying a steam table pan.

Another object of the invention is to provide such a cover which eliminates or at least minimizes the need to use insulated pads while carrying a steam table pan.

Yet another object of the invention is to provide such a cover which makes it easy to place a filled pan into a steam table.

Another object of the invention is to provide such a cover which helps avoid spills when placing a steam table pan containing liquid.

Another object of the invention is to provide such a cover which makes it easy to lift a pan out of a steam table.

Still another object of the invention is to provide a cover whereby the cover and a pan being carried therewith are well secured to one another. How these and other objects are accomplished will become apparent from the following descriptions and from the drawings.

SUMMARY OF THE INVENTION

The invention involves a carrying cover for a food pan such as a pan of the type used in steam tables for keeping food warm. The cover includes (a) a pair of side channels generally parallel to one another, (b) first and second cover ends generally parallel to one another and generally normal to the side channels, and (c) a handle. In the improvement, the handle is positioned closer to the first end (that cover end which has no channel and, thus, is open) than to the second end which has an end channel. The handle has a long axis and best "control" of the cover and a pan being carried thereby results when such axis is generally parallel to the side channels.

In another of its aspects, the invention involves the combination of a steam table pan and the carrying cover. The pan includes a container portion and four edges protruding outwardly from the container portion. Each edge is substantially flat (as opposed to "rolled" or bead-like) and all edges are coincident with a common plane. When the pan is resting on a table or in a steam table, the plane is horizontal.

The cover includes plural channels, each for engaging a respective edge of the pan. Each channel includes (a) an upper member extending away from the dome-like central portion, (b) an edge panel extending downwardly from the upper member, and (c) a lip extending inwardly from the edge panel. The upper member, the edge panel and the lip form an inwardly-facing channel in which the juncture of the upper member and the edge panel and the juncture of the edge panel and the lip are substantially right angles.

When the cover is mounted on the pan in a pan-carrying position, a separate pan edge is between the upper member and the lip of each channel and the dimension between the upper member and the lip is substantially greater than the thickness of the pan edge therebetween. To put it in other words, there is some clearance between the channel and its respective pan edge so that the cover may slide easily into and out of engagement with the pan.

The pan edges include two side edges and two end edges, each of the latter being somewhat shorter than each of the former. The cover includes two side channels, each engaging a respective side edge and the cover includes but a single end channel engaging one of the end edges. That is, the other end edge is free of engagement with any end channel.

The cover has a pair of end boundaries and a center point midway between them. There is also a carrying handle having a middle region and it is particularly noteworthy that the handle middle region is spaced from the center point. In other words, the handle middle region is "off center" as viewed along the pan/cover long axis so that the weight of the pan tends to urge the pan toward the end channel rather than toward the open cover end opposite the cover end channel. Viewed yet another way, the distance from the middle region to that cover end having the channel is greater than the distance from the middle region to that cover end which is open.

In other aspects of the combination, the pan is substantially filled with food and has a center of gravity. The carrying handle middle region is between the center of gravity and the first end, i.e., the open end. When the cover is mounted to the pan, there is a pan edge in the sole cover end channel. And when the cover supports the pan above a surface as when the pan is being carried by the cover, the cover and pan are angled with respect to such surface. Gravity urges the pan edge toward the end channel, thereby securely holding the pan in the cover.

Other aspects of the invention are set forth in the following detailed description and in the drawings.

DETAILED DESCRIPTION OF PREFERRED EMBODIMENTS

Figure 1:
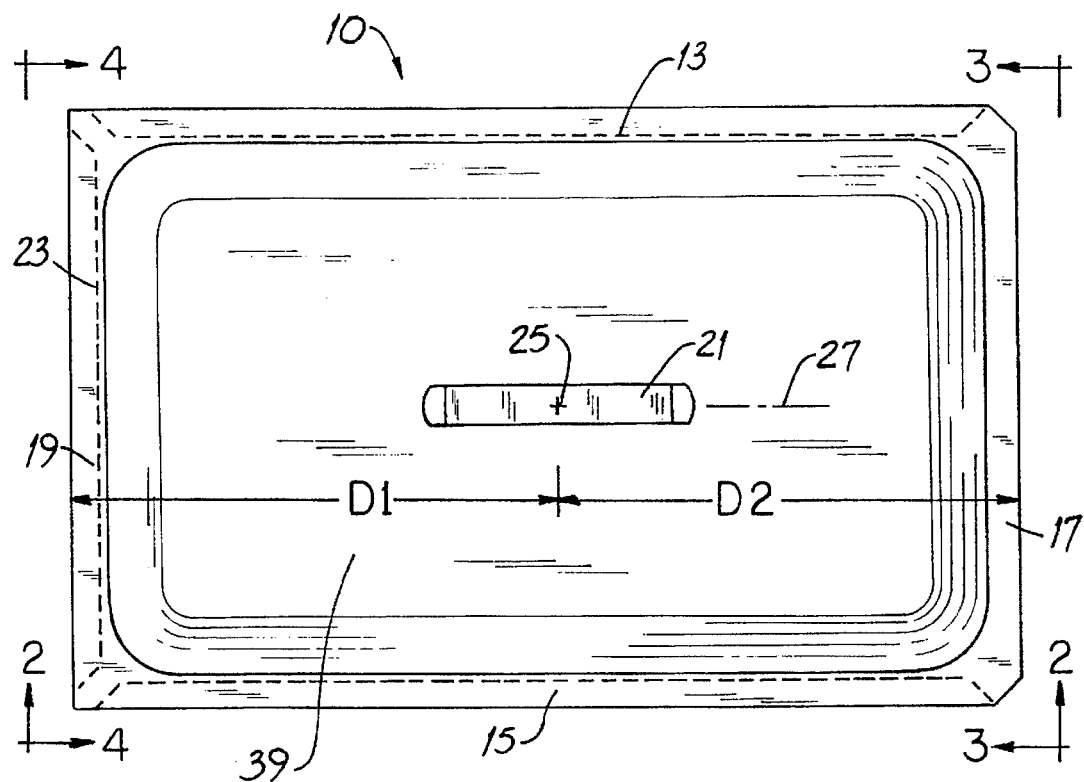
FIG. 1 is a top plan view of the new cover for carrying a steam table pan. Surfaces of parts are shown in phantom (dashed) outline.

Referring to FIGS. 1-6, the new carrying cover 10 is configured for a food pan 11 of the type used in steam tables for keeping food warm. The cover 10 includes a pair of side channels 13 and 15 oriented generally parallel to one another and first and second cover ends 17 and 19, respectively. Such ends 17, 19 are generally parallel to one another and generally normal to the side channels 13, 15. A loop handle 21 is used to lift the cover 10 and the pan 11 engaged therewith.

As shown in FIGS. 1, 2, 7, 8, and 9, the center point 25 of the handle 21 is positioned closer to the first end 17 (that cover end 17 which has no channel and, thus, is open) than to the cover second end 19 which has an end channel 23. In more specific terms, the dimension D1 is slightly greater than the dimension D2. In a very specific embodiment, such dimensions D1 and D2 are about 10.8 inches and 10.2 inches, respectively. The handle 21 has a long axis 27 and best "control" of the cover 10 and a pan 11 being carried thereby results when such axis 27 is generally parallel to the side channels 13, 15.

Figure 2:
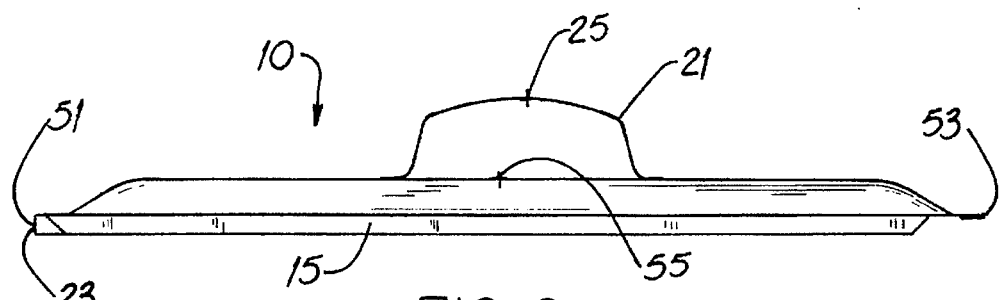
FIG. 2 is a side elevation view of the cover of FIG. 1 taken along the viewing plane 2—2 thereof.
Figure 3:
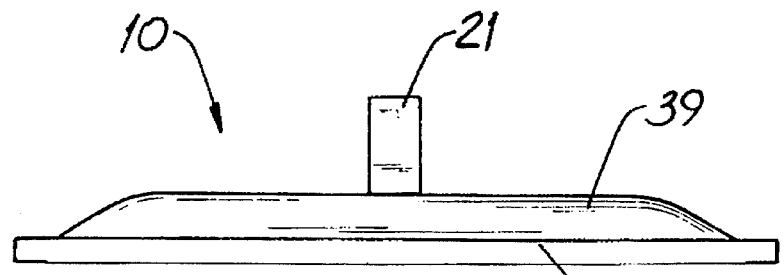
FIG. 3 is an elevation view of the first end of the cover of FIG. 1 taken along the viewing plane 3—3 thereof.
Figure 4:
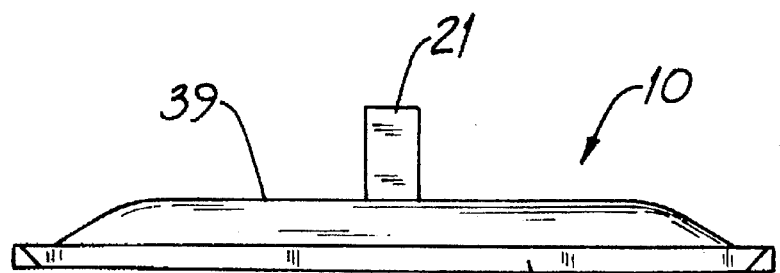
FIG. 4 is an elevation view of the second end of the cover of FIG. 1 taken along the viewing plane 4—4 thereof.
Figure 10:
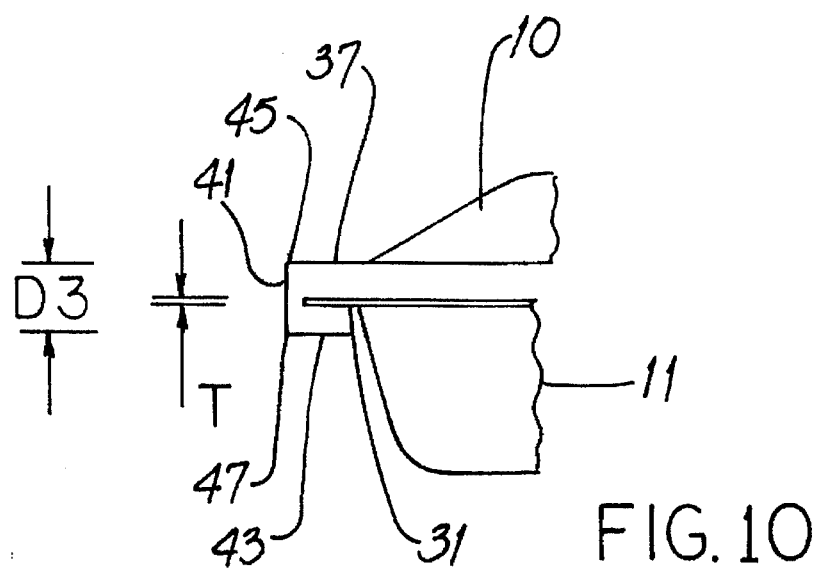
FIG. 10 is an elevation view of a cover channel and an edge of a steam table pan. Parts are broken away.
Figure 5:
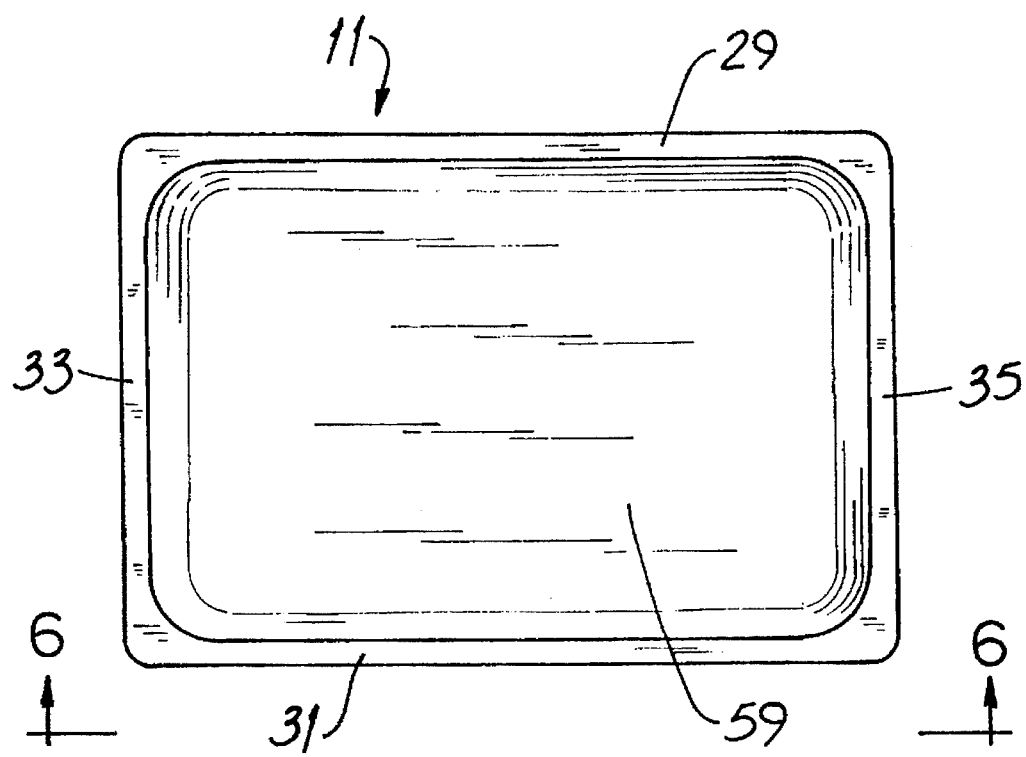
FIG. 5 is a top plan view of a prior art steam table pan.
Figure 6:
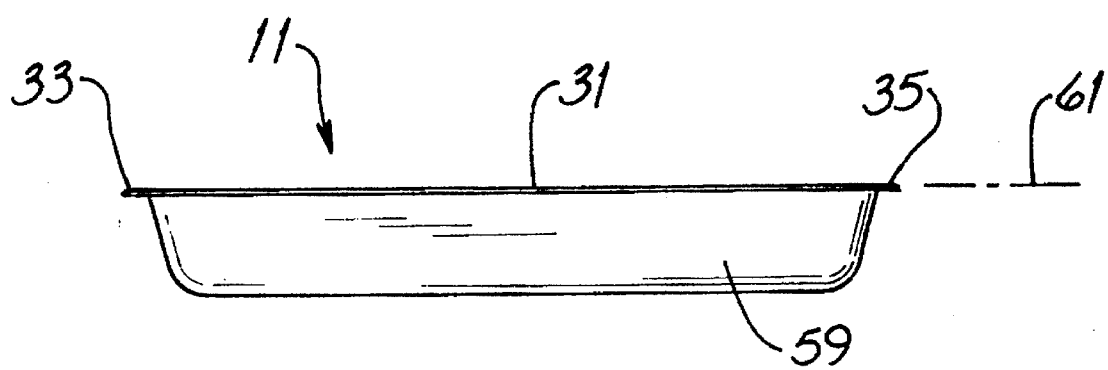
FIG. 6 is an elevation view of the pan of FIG. 5 taken along the viewing plane 6—6 thereof.
Figure 7:
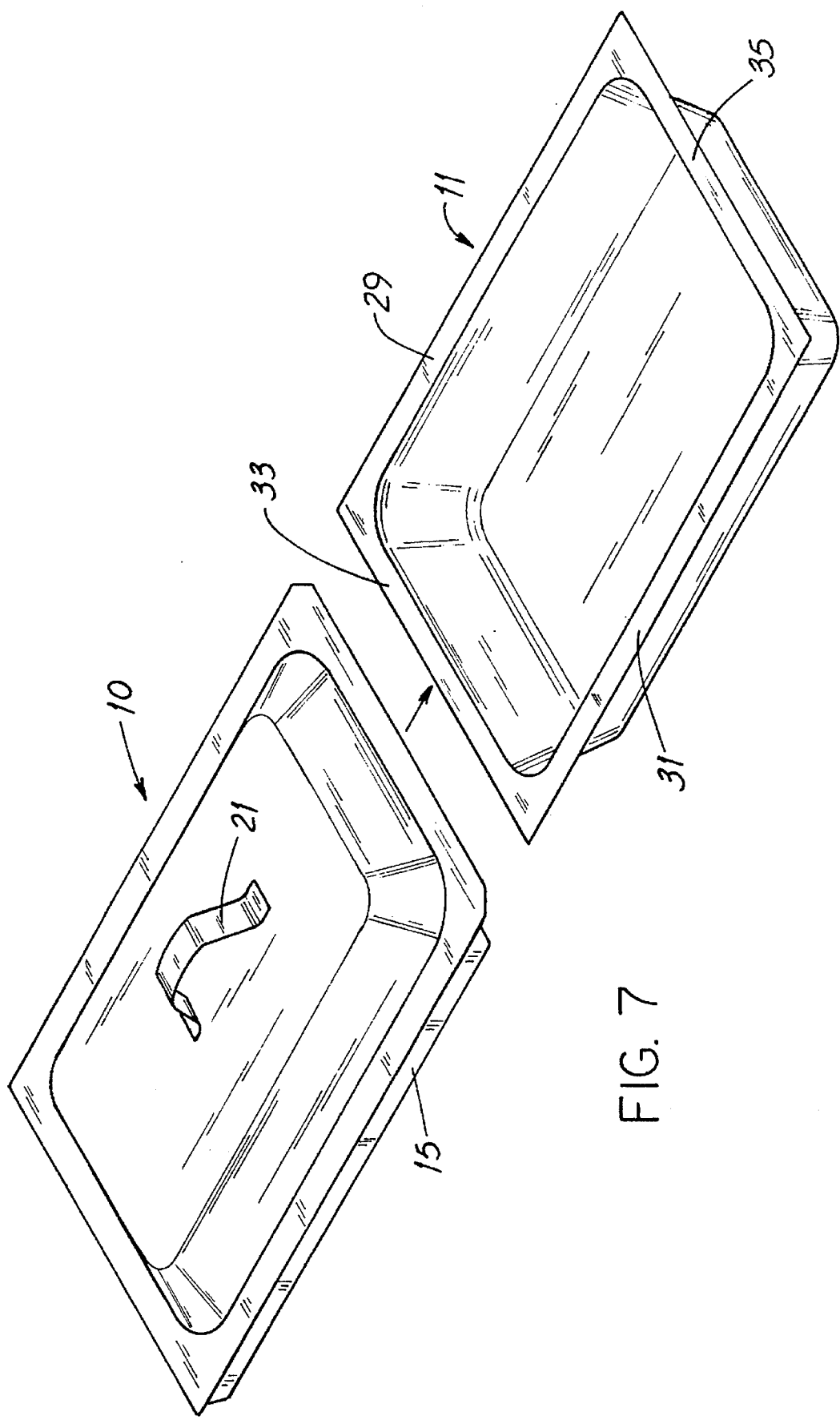
FIG. 7 is a perspective view of the cover of FIGS. 1-4 and the pan of FIGS. 5 and 6 showing how the cover slides into engagement with the pan.

The cover side channels 13 and 15 are configured for engaging respective side edges 29, 31 of the pan 11 while the cover end channel 23 is configured to engage a pan end edge 33. Referring particularly to FIGS. 1, 2 and 10, each channel 13, 15 and 23 includes an upper member 37 extending away from the dome-like cover central portion 39 and an edge panel 41 extending downwardly from the upper member 37. A retention lip 43 extends inwardly from each edge panel 41. As to each channel 13, 15, or 23, the upper member 37, the edge panel 41 and the lip 43 form a horizontally-facing channel in which the juncture 47 of the upper member 37 and the edge panel 41 and the juncture 47 of the edge panel 41 and the lip 43 are substantially right angles.

Referring particularly to FIGS. 1 and 2, in other aspects of the invention, the cover 10 has a pair of end boundaries 51, 53 and a center point 55 halfway between them. The carrying handle 21 has a middle region and center point 25 and it is particularly noteworthy that the handle center point 25 is spaced slightly from the cover center point 55.

In other words, the handle middle region is slightly "off center." When the middle region is so positioned, the weight of the pan 11 tends to urge the pan 11 toward the end channel 23 rather than toward the open cover end 17 opposite the cover end channel 23.

Referring to the FIGURES and particularly to FIGS. 5, 6, 8, 9 and 10, another aspect of the invention involves the combination of a steam table pan 11 and the carrying cover 10. The pan 11 includes a container portion 59 and four edges 29, 31, 33, 35 protruding outwardly from the container portion 59. Each edge 29, 31, 33, 35 is substantially flat (as opposed to "rolled" or bead-like) and all edges 29, 31, 33, 35 are coincident with a common plane 61. When the pan 11 is resting on a table or in a steam table, the plane 61 is horizontal.

Figure 8:
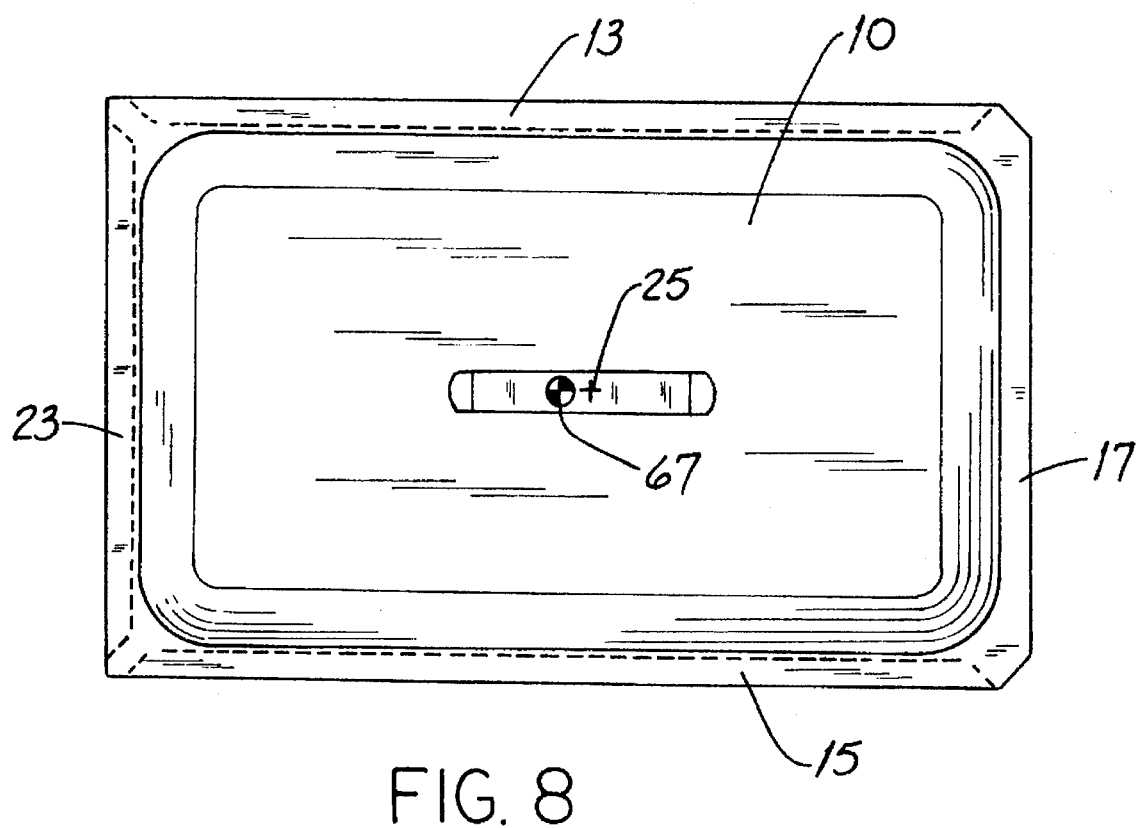
FIG. 8 is a top plan view of the cover generally like that of FIG. 1. Surfaces of parts are shown in phantom (dashed) outline.
Figure 9:
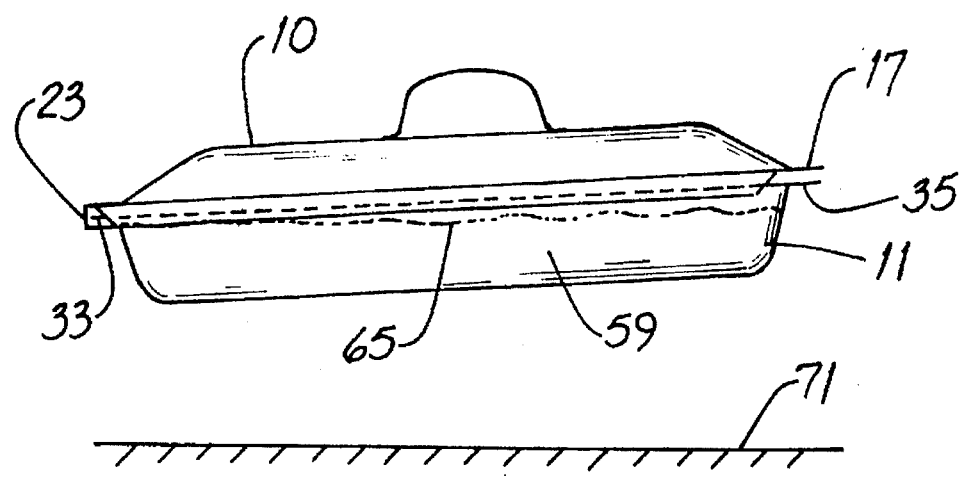
FIG. 9 is a side elevation view of the new cover and a steam table pan filled with food, both slightly above and angled with respect to a horizontal surface. Certain surfaces are shown in phantom (dashed) outline.

When the cover 10 is mounted on the pan 11 in a pan-carrying position as shown in FIGS. 8 and 9, a separate pan edge 29, 31, 33 is between the upper member 37 and the lip 43 of each channel 13, 15, 23 and the dimension D3 between the upper member 37 and the lip 43 is substantially greater than the thickness T of the pan edge, e.g., edge 31 therebetween. To put it in other words, there is some clearance between the channel 13, 15, 23 and its respective pan edge 29, 31, 33 so that the cover 10 may slide easily into and out of engagement with the pan 11. (For clarity of explanation, the exemplary pan edge 31 is shown spaced from both upper member 37 and lip 43. When the cover 10 is mounted on the pan 11 and used to lift or carry the pan 11, the edge 31 rests on the lip 43.)

The pan edges include two illustrated side edges 29, 31 and two end edges 33, 35, each of the latter being somewhat shorter than each of the former. The cover side channels 13, 15, each engage a respective side edge 29, 31 and the cover 10 includes but a single end channel 23 engaging one of the end edges 33 or 35. That is, the other end edge 35 or 33 is free of engagement with any end channel 23 on the cover 10. (In the FIGURES and the specification, the cover end channel 23 is shown to engage the edge 33 of the pan 11 and the cover first end 17 which is open is adjacent to the edge 35 of the pan 11. But of course, the end channel 23 may engage the edge 35 of the pan 11 which is symmetrical.)

Referring next to FIGS. 8 and 9, the pan 11 is substantially filled with food 65 and the pan-food combination has a center of gravity as represented by the symbol 67. The carrying handle center point 25 is between the center of gravity 67 and the first end 17, i.e., the open end. When the cover 10 is mounted to the pan 11, there is a pan edge 33 in the sole cover end channel 23. And when the cover 10 supports the pan 11 above a surface 71 (e.g., a floor) as when the pan 11 is being carried by the cover 10, the cover 10 and pan 11 are angled with respect to such surface 71 as shown in FIG. 9. Gravity urges the pan edge 33 toward the end channel 23, thereby securely holding the pan 11 in the cover 10.

While the principles of the invention have been shown and described in connection with one or more specific embodiments, it is to be understood clearly that such embodiment(s) are by way of example and are not limiting.

What is claimed:

1. In combination, a steam table pan for keeping food warm and a cover for lifting and carrying the pan, and wherein:

the pan includes a container portion and four edges protruding outwardly from the container portion, each edge being substantially flat and coincident with a plane;

and wherein:

the cover includes plural channels, each for engaging a respective edge of the pan, each channel including (a) an upper member, (b) an edge panel extending downwardly from the upper member, and (c) a lip extending inwardly from the edge panel;

when the cover is mounted on the pan in a pan-carrying position, a separate pan edge is between the upper member and the lip of each channel; and the dimension between the upper member and the lip is substantially greater than the thickness of the pan edge therebetween.

2. The combination of claim 1 wherein:

the pan edges include two side edges and two end edges;

the plural channels include two side channels, each engaging a respective side edge; and the the plural channels also include a single end channel engaging one of the end edges.

3. The combination of claim 2 wherein:

the cover includes a carrying handle having a middle region;

the cover has a pair of end boundaries and a center point midway between the end boundaries; and the handle middle region is spaced from the center point.

4. The combination of claim 3 wherein:

the cover has an open end opposite the end channel; and the distance from the middle region to the end channel is greater than the distance from the middle region to the open end.

5. In combination, a carrying cover and a food pan, the cover including (a) a pair of side channels generally parallel to one another, (b) first and second cover ends generally parallel to one another and generally normal to the side channels, and (c) a loop handle, and wherein:

the second cover end includes a rigid edge panel preventing movement of the pan out of such second end;

the first end is open; and the handle is positioned closer to the first end than to the second end.

6. The cover of claim 5 wherein the handle has a long axis generally parallel to the side channels.

7. In combination, a steam table pan for keeping food warm and a cover for carrying the pan, and wherein:

when substantially filled with food, the pan has a center of gravity;

the cover has first and second ends, the first end being an open end; and the cover includes a carrying handle having a middle region positioned between the center of gravity and the first end.

8. The combination of claim 7 wherein the second cover end includes a rigid end channel and the pan includes a pan edge in the end channel.

9. The combination of claim 8 wherein the cover supports the pan above a surface, the cover and pan are angled with respect to such surface and gravity urges the pan edge toward the end channel.

* * * * *